(12) United States Patent
Lindackers et al.

(10) Patent No.: US 7,492,319 B2
(45) Date of Patent: Feb. 17, 2009

(54) ANTENNA ASSEMBLIES INCLUDING STANDARD ELECTRICAL CONNECTIONS AND CAPTURED RETAINERS AND FASTENERS

(75) Inventors: Ralf Lindackers, Waterford, MI (US); Hasan Yasin, Holly, MI (US); Christopher J. Jared, Davison, MI (US); Philip J. Kekel, Saginaw, MI (US)

(73) Assignee: Laird Technologies, Inc., Chesterfield, MO (US)

( * ) Notice: Subject to any disclaimer, the term of this patent is extended or adjusted under 35 U.S.C. 154(b) by 141 days.

(21) Appl. No.: 11/602,172

(22) Filed: Nov. 20, 2006

(65) Prior Publication Data

US 2008/0074342 A1   Mar. 27, 2008

Related U.S. Application Data

(60) Provisional application No. 60/846,863, filed on Sep. 22, 2006, provisional application No. 60/847,776, filed on Sep. 28, 2006.

(51) Int. Cl.
*H01Q 1/32* (2006.01)

(52) U.S. Cl. .................. 343/713; 343/711; 439/544; 403/252

(58) Field of Classification Search .............. 343/713, 343/711, 712, 906; 403/197, 252; 439/544
See application file for complete search history.

(56) References Cited

U.S. PATENT DOCUMENTS

| | | | |
|---|---|---|---|
| 4,090,030 A | 5/1978 | Lagasse | |
| 4,218,682 A | 8/1980 | Yu | |
| 4,401,988 A | 8/1983 | Kaloi | |
| H526 H | 9/1988 | Miller | |
| 4,862,183 A * | 8/1989 | Blaese | 343/715 |
| 5,121,127 A | 6/1992 | Toriyama | |
| 5,402,135 A | 3/1995 | De Marre et al. | |
| 5,515,064 A | 5/1996 | Bacnik et al. | |
| 5,585,809 A | 12/1996 | Yajima et al. | |
| 5,748,155 A * | 5/1998 | Kadunce et al. | 343/713 |
| 5,757,327 A | 5/1998 | Yajima et al. | |
| 5,900,840 A | 5/1999 | Yajima | |
| 6,023,245 A | 2/2000 | Gomez et al. | |
| 6,099,350 A * | 8/2000 | Wright | 439/582 |
| 6,168,855 B1 | 1/2001 | Cohen et al. | |

(Continued)

FOREIGN PATENT DOCUMENTS

DE   10 2005 044 611.6   9/2005

(Continued)

*Primary Examiner*—Tho G Phan
(74) *Attorney, Agent, or Firm*—Harness, Dickey & Pierce, P.L.C.

(57) ABSTRACT

In various exemplary embodiments, an antenna assembly is configured for installation to a vehicle body wall having a mounting hole. The antenna assembly generally includes an antenna base configured to be disposed along an external side of the vehicle body wall. An electrical connector is coupled to the antenna base such that, when the antenna base is disposed along the external side of the vehicle body wall, the electrical connector is accessible from inside the vehicle. Accordingly, an installer (from inside the vehicle) may thus plug a communication link into the electrical connector to thereby allow the communication link to communicate signals received by the antenna assembly to another device.

34 Claims, 12 Drawing Sheets

U.S. PATENT DOCUMENTS

| | | | |
|---|---|---|---|
| 6,377,219 B2 | 4/2002 | Smith | |
| D461,796 S | 8/2002 | Boyer | |
| D465,480 S | 11/2002 | Boyer | |
| 6,486,837 B2 | 11/2002 | Spiegel et al. | |
| 6,486,841 B1 | 11/2002 | Imahigashi | |
| 6,492,960 B2 | 12/2002 | Sullivan | |
| 6,639,558 B2 | 10/2003 | Kellerman et al. | |
| 6,674,412 B1 | 1/2004 | Schmidt et al. | |
| 6,714,171 B2 | 3/2004 | Haussler et al. | |
| 6,762,727 B2 | 7/2004 | Rochford et al. | |
| 6,879,294 B2 | 4/2005 | Yuanzhu | |
| 6,879,301 B2 | 4/2005 | Kozlovski | |
| 6,930,643 B2 | 8/2005 | Byrne et al. | |
| 6,999,033 B2 | 2/2006 | Kordass et al. | |
| 7,002,523 B2 | 2/2006 | Noro | |
| 7,004,666 B2 | 2/2006 | Kozlovski | |
| 7,019,705 B2 | 3/2006 | Pfletschinger et al. | |
| 7,046,207 B2 | 5/2006 | Takahashi | |
| 7,088,297 B2 | 8/2006 | Nakano et al. | |
| 7,106,272 B2 | 9/2006 | Noro et al. | |
| 7,212,168 B2 | 5/2007 | Kozlovski | |
| 2002/0145567 A1 | 10/2002 | Spiegel et al. | |
| 2003/0067182 A1* | 4/2003 | Rochford et al. | 296/1.1 |
| 2003/0068198 A1* | 4/2003 | Kozlovski | 403/372 |
| 2003/0176104 A1 | 9/2003 | Hall et al. | |
| 2003/0197649 A1 | 10/2003 | Kozlovski | |
| 2003/0231136 A1 | 12/2003 | Du | |
| 2004/0104858 A1 | 6/2004 | Pfletschinger et al. | |
| 2004/0150572 A1 | 8/2004 | Ohno et al. | |
| 2004/0174311 A1 | 9/2004 | Kordass et al. | |
| 2004/0217472 A1 | 11/2004 | Aisenbrey et al. | |
| 2005/0225489 A1 | 10/2005 | Aizawa et al. | |
| 2005/0237248 A1 | 10/2005 | Nakano et al. | |
| 2006/0012533 A1 | 1/2006 | Noro | |
| 2006/0077110 A1 | 4/2006 | Blickle | |
| 2006/0094294 A1 | 5/2006 | Blickle | |
| 2006/0097937 A1 | 5/2006 | Gorai et al. | |
| 2006/0110214 A1 | 5/2006 | Kozlovski | |
| 2006/0244667 A1 | 11/2006 | Thompson et al. | |
| 2007/0085361 A1 | 4/2007 | Hauser | |
| 2007/0103374 A1 | 5/2007 | Lindackers et al. | |
| 2007/0171138 A1 | 7/2007 | Noro | |

FOREIGN PATENT DOCUMENTS

| | | |
|---|---|---|
| EP | 1411585 | 4/2004 |
| EP | 0862239 | 2/2005 |
| JP | 2005-20660 | 1/2005 |

* cited by examiner

ANTENNA ASSEMBLIES INCLUDING STANDARD ELECTRICAL CONNECTIONS AND CAPTURED RETAINERS AND FASTENERS

CROSS-REFERENCE TO RELATED APPLICATIONS

This application claims the benefit of U.S. Provisional Application No. 60/846,863 filed Sep. 22, 2006 and U.S. Provisional Application No. 60/847,776 filed Sep. 28, 2006. The disclosures of the above applications are incorporated herein by reference.

FIELD

The present disclosure generally relates to apparatus and methods relating to mounting antenna assemblies to supporting structures, such as vehicle roofs, hoods, or trunk lids.

BACKGROUND

The statements in this section merely provide background information related to the present disclosure and may not constitute prior art.

Patch antennas are narrowband, wide-beam antennas that include active antenna elements bonded to dielectric substrates. Patch antennas typically have a relatively low profile compared to aerial antennas and are mechanically rugged. Patch antennas are therefore suitable for mounting on the exterior of vehicles to receive satellite signals, such as Satellite Digital Audio Radio Services (SDARS). Patch antennas for automotive use are commonly positioned on the roof, hood, or trunk lid to help ensure that the patch antenna has an unobstructed view overhead or towards the zenith.

SUMMARY

According to various aspects, exemplary embodiments are provided of antenna assemblies, mounting methods, and mounting devices. In various exemplary embodiments, an antenna assembly is configured for installation to a vehicle body wall having a mounting hole. The antenna assembly generally includes an antenna base configured to be disposed along an external side of the vehicle with respect to the vehicle body wall. An electrical connector is coupled to the antenna base such that, when the antenna base is disposed along the external side of the vehicle, the electrical connector is accessible from inside the vehicle for a pluggable electrical connection to at least one communication link. The communication link may be used for communicating signals received by the antenna assembly to another device. The antenna assembly may also include a fastener member and first and second retaining components. The first retaining component may have one or more tapered faces and one or more shoulder portions. The first retaining component may be inserted through the mounting hole such that the shoulder portions are disposed on the interior compartment side while the antenna base is disposed on the external side of the vehicle body wall. In this stage of the installation process, the antenna assembly may thus be held in place relative to the vehicle body wall in a first installed position. The second retaining component may have an opening through which the fastener member passes and one or more legs. The one or more legs may be configured to make contact with the corresponding tapered faces of the first retaining component. When the second retaining component is moved generally towards the mounting hole by driving the fastener member in a direction generally towards the antenna base, the one or more legs may deform and expand generally outwardly relative to the mounting hole against the interior compartment side of the vehicle body wall, thereby securing the antenna assembly to the vehicle body wall in a second, operational installed position.

In another exemplary embodiment, an antenna assembly is configured to be installed and fixedly mounted to a vehicle body wall after being inserted into a mounting hole in the vehicle body wall from an external side of the vehicle and nipped from the interior compartment side. The antenna assembly generally includes an antenna base configured to be disposed along an external side of the vehicle body wall. An electrical connector is coupled to the antenna base such that, when the antenna base is disposed along the external side of the vehicle body wall, the electrical connector is accessible from inside the vehicle for a pluggable electrical connection to at least one communication link. The communication link may then be used for communicating signals received by the antenna assembly to another device.

Other aspects relate to methods of installing antenna assemblies to supporting structures, such as vehicle body walls having external and internal sides with a mounting hole therebetween. In some exemplary embodiments, a method generally includes inserting the antenna assembly into a mounting hole from an external side of the vehicle body wall, such that the antenna base is disposed along the external side of the vehicle body wall and such that an electrical connector coupled to the antenna base is accessible from the internal side of the vehicle body wall. The antenna assembly may thus be held in place relative to the vehicle body wall in a first installed position by shoulder portions of a first retaining component of the antenna assembly being disposed along the internal side of the vehicle body wall. Then, from the internal side of the vehicle body wall, a fastener member may be driven to compressively move a second retaining component such that one or more legs of the second retaining component deform and expand generally outwardly relative to the mounting hole against the second side of the supporting structure, thereby securing the antenna assembly to the supporting structure in a second, operational installed position. Also from the internal side of the vehicle body wall, at least one communication link may be plugged into the electrical connector of the antenna assembly so as to allow the communication link to communicate signals received by the antenna assembly to another device.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

Figure 4:
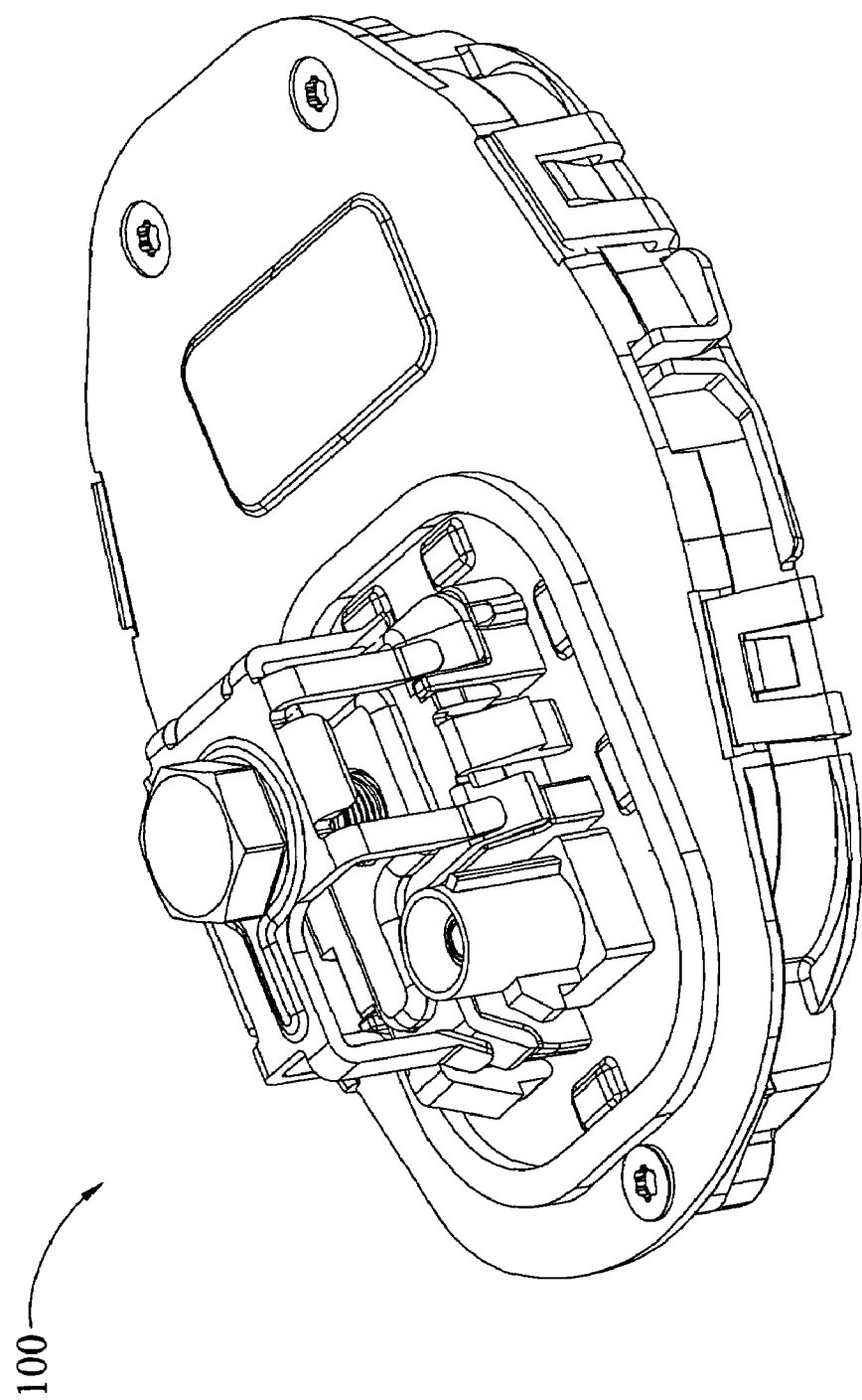
FIG. 4 is a bottom perspective view of the antenna assembly shown in FIGS. 2 through 3 but illustrating the bolt threadedly engaged to a corresponding threaded portion of the antenna base and passing through a hole in the retaining component to thereby capture the retaining component against other components associated with the antenna base.
Figure 5:
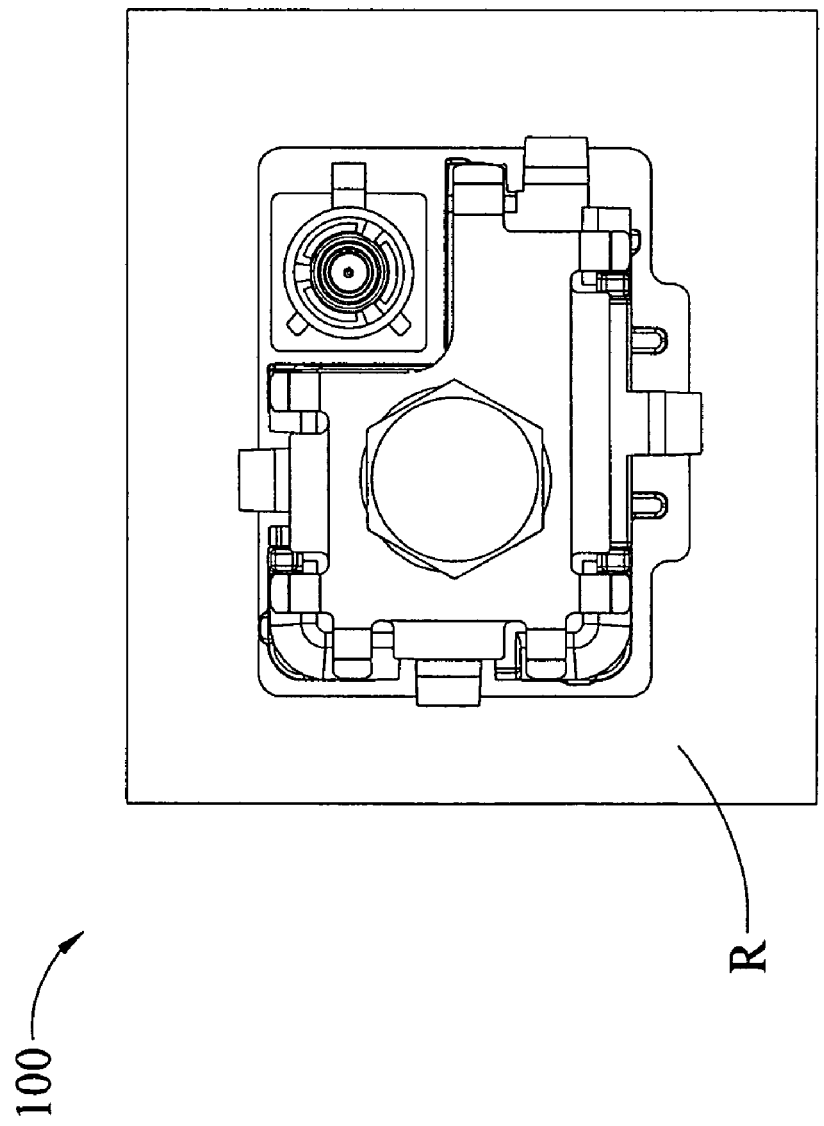
Figure 6:
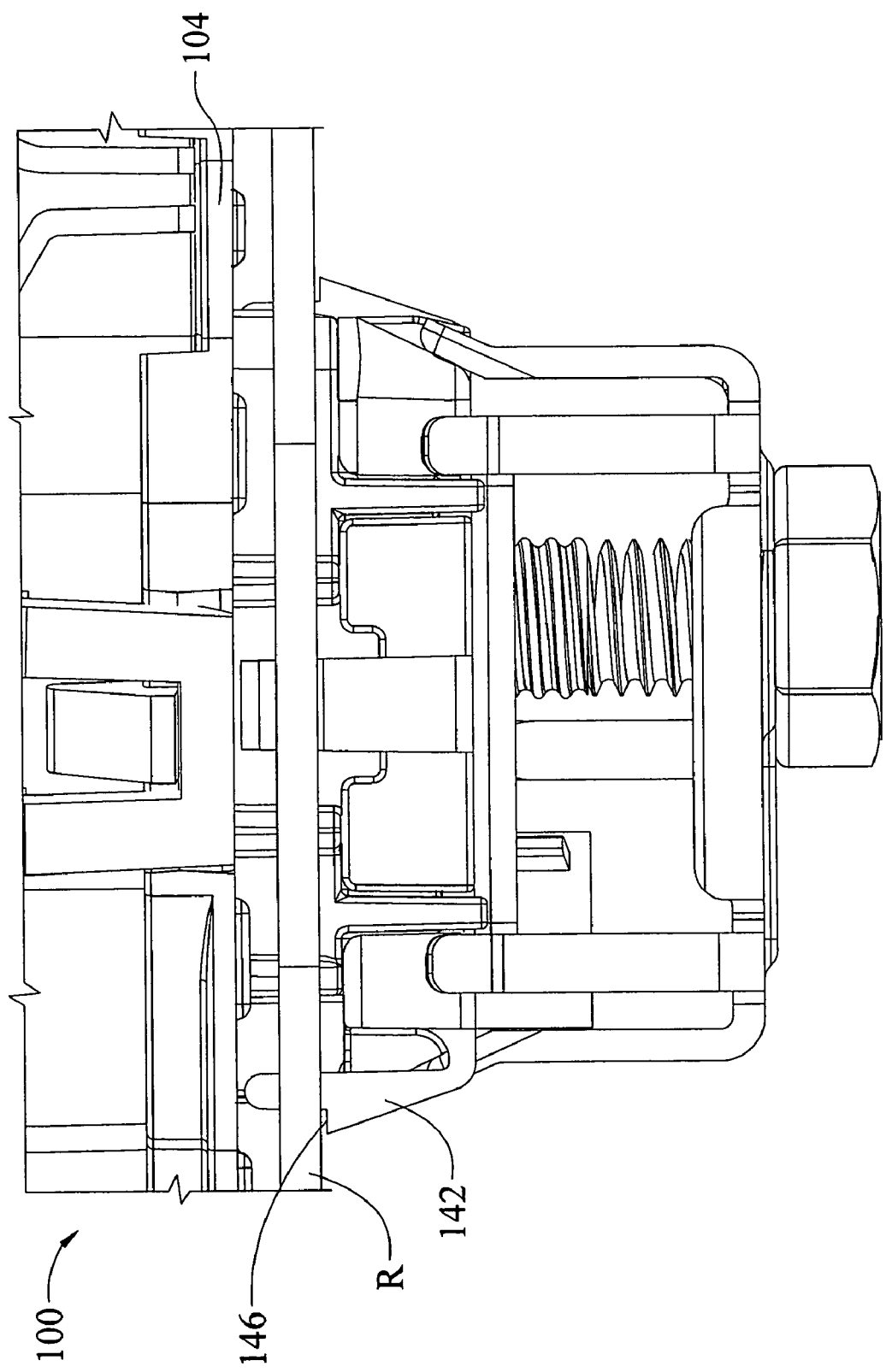
Figure 7:
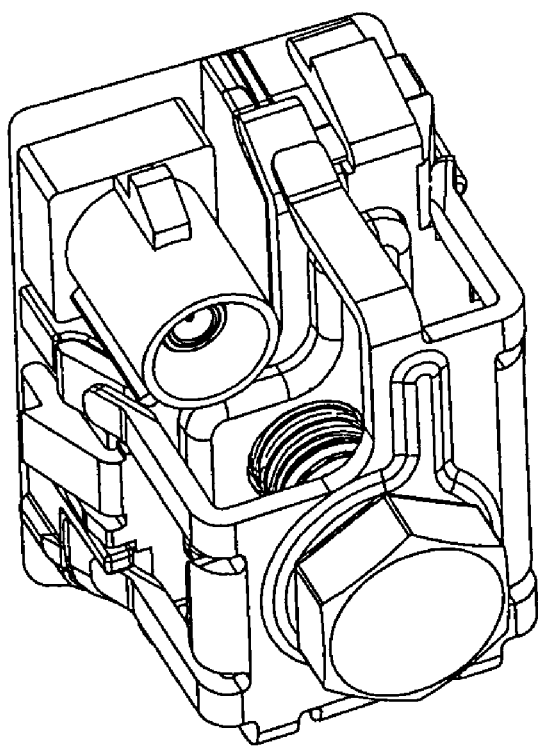
Figure 8A:
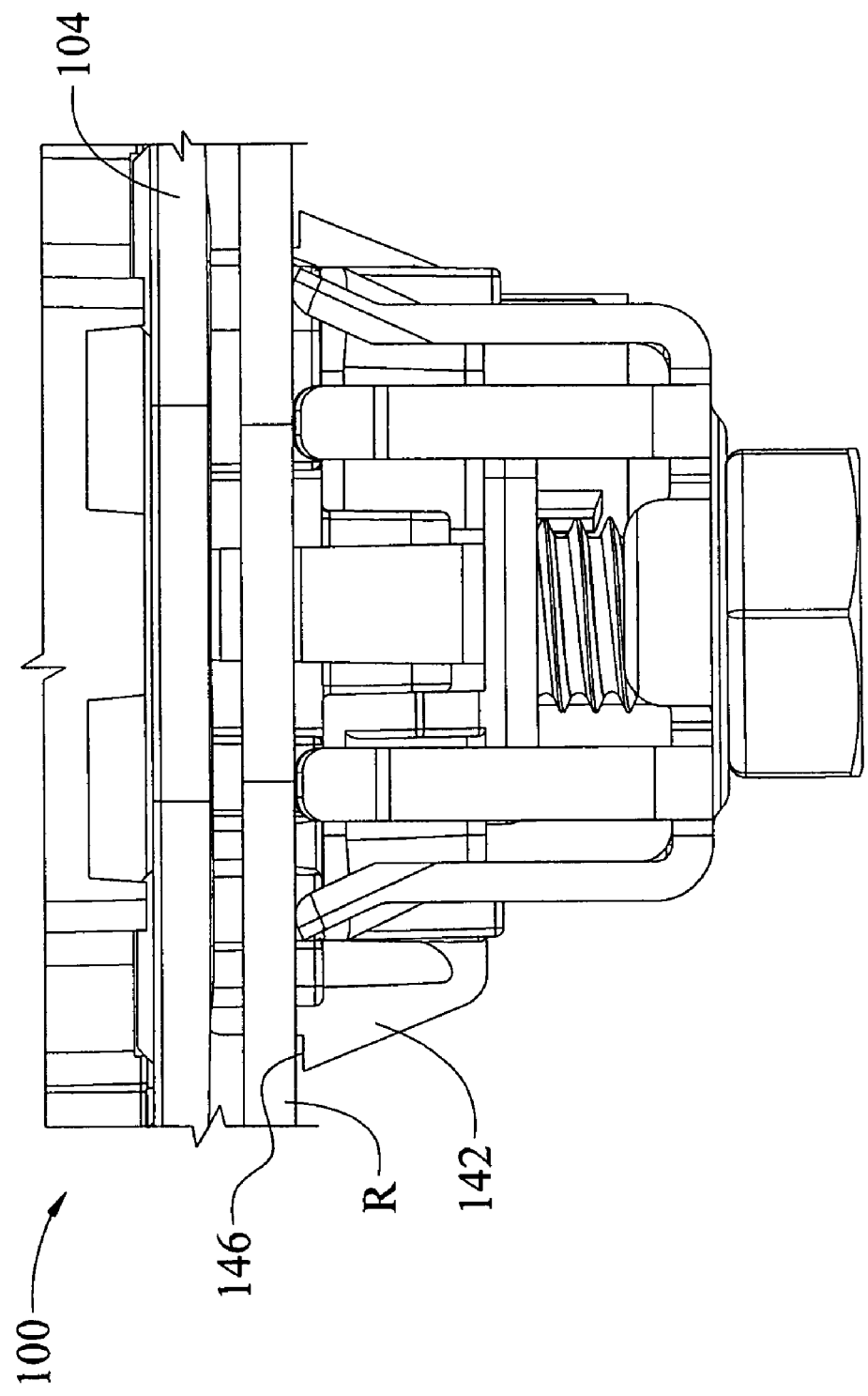
Figure 8B:
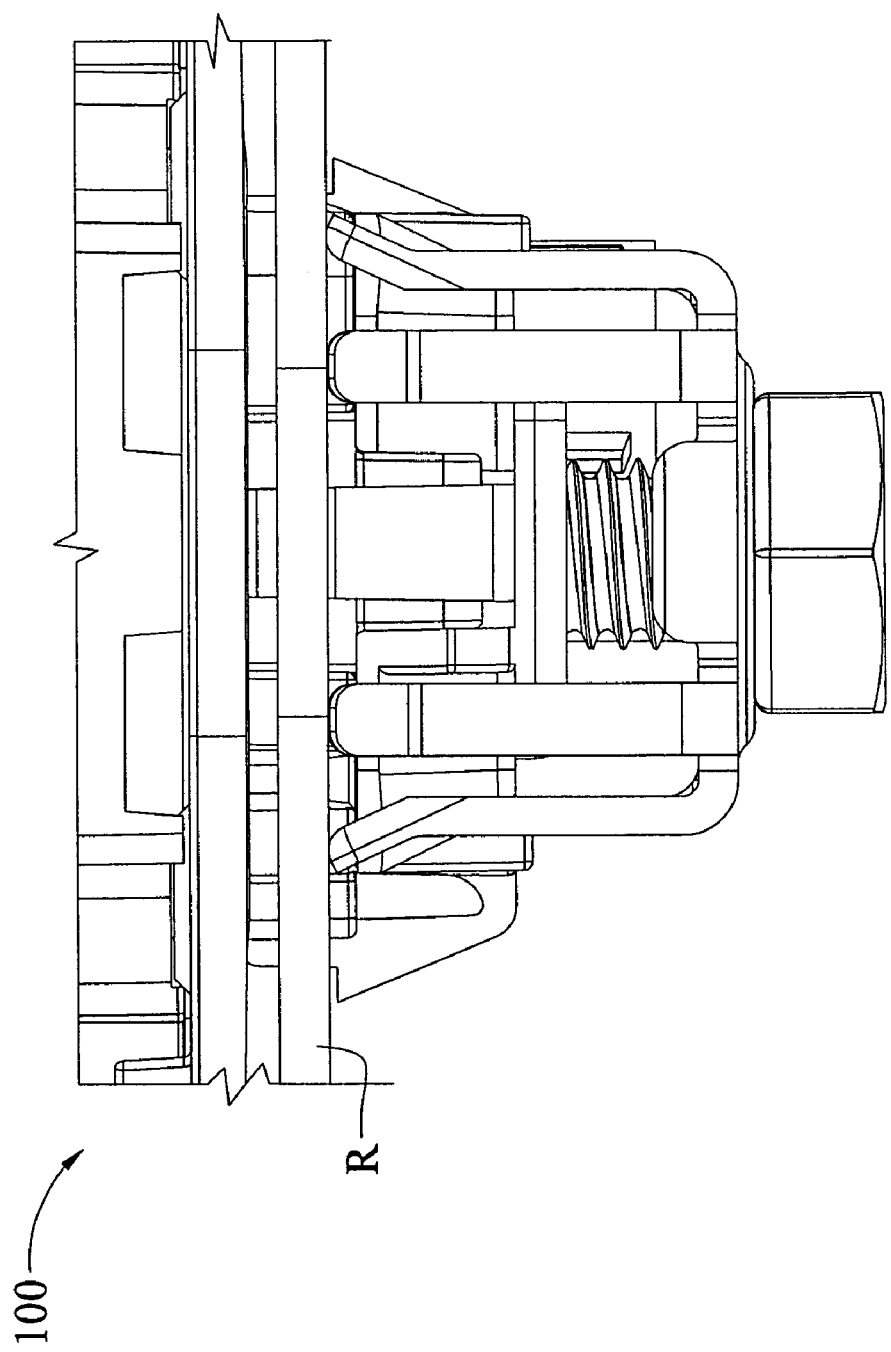
Figure 8C:
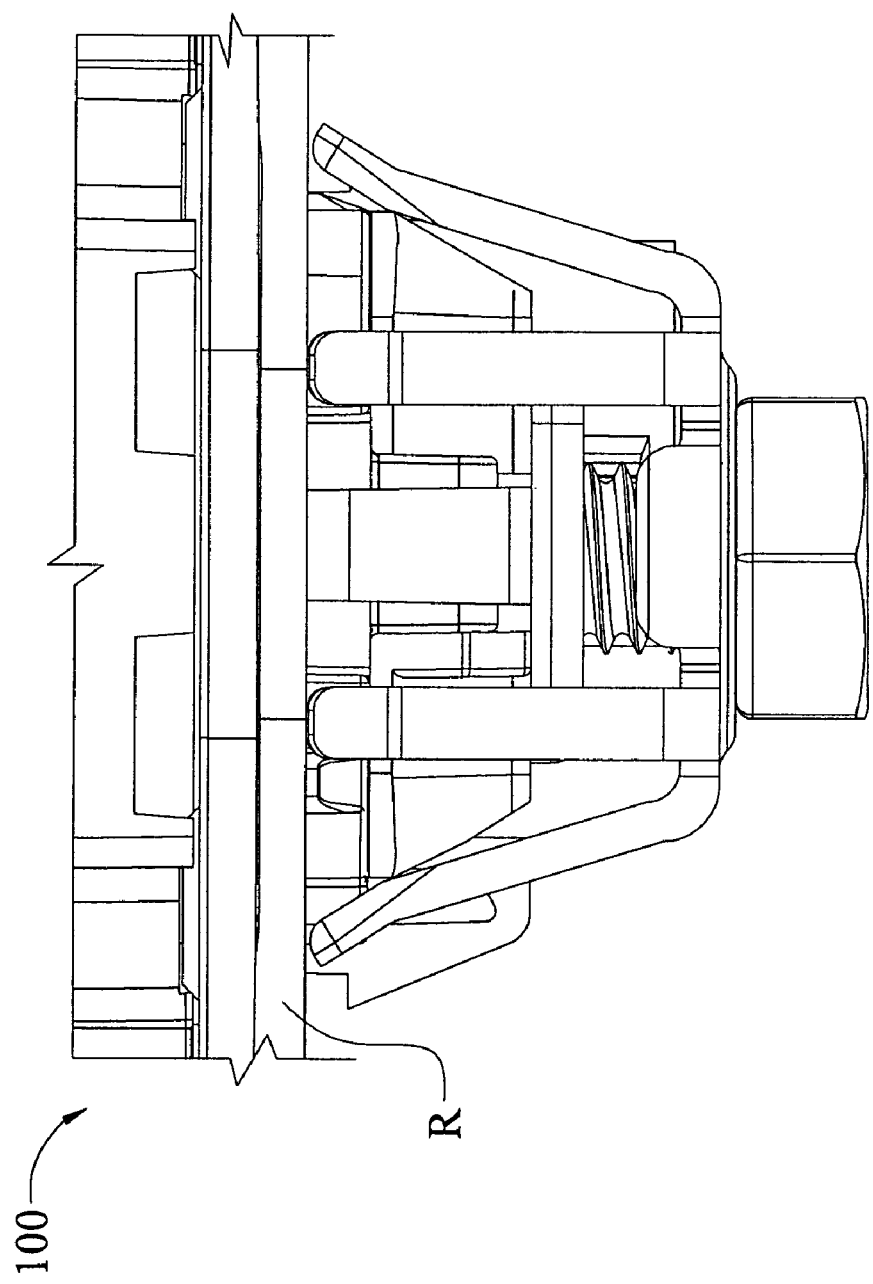
Figure 8D:
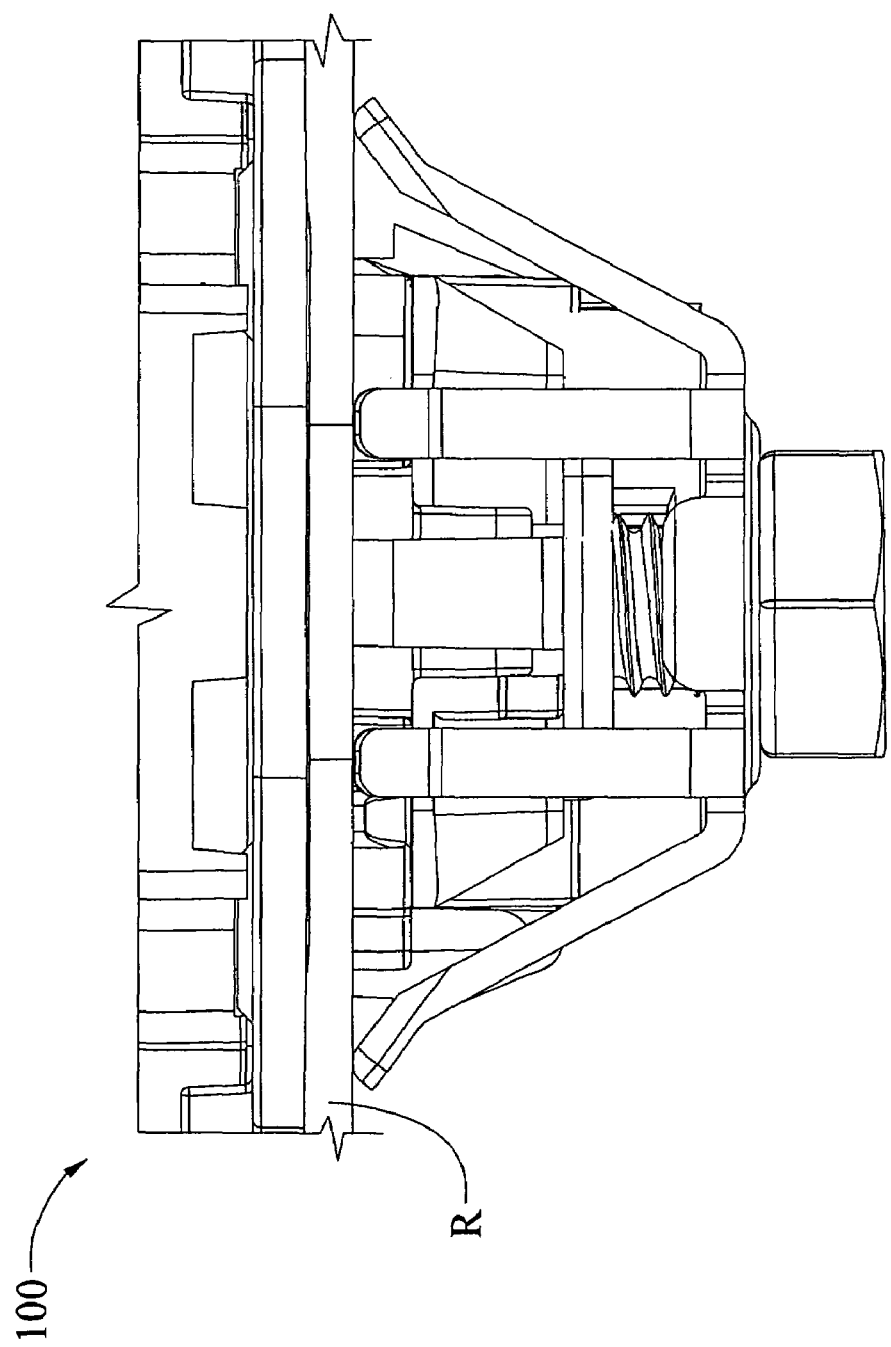
Figure 9:
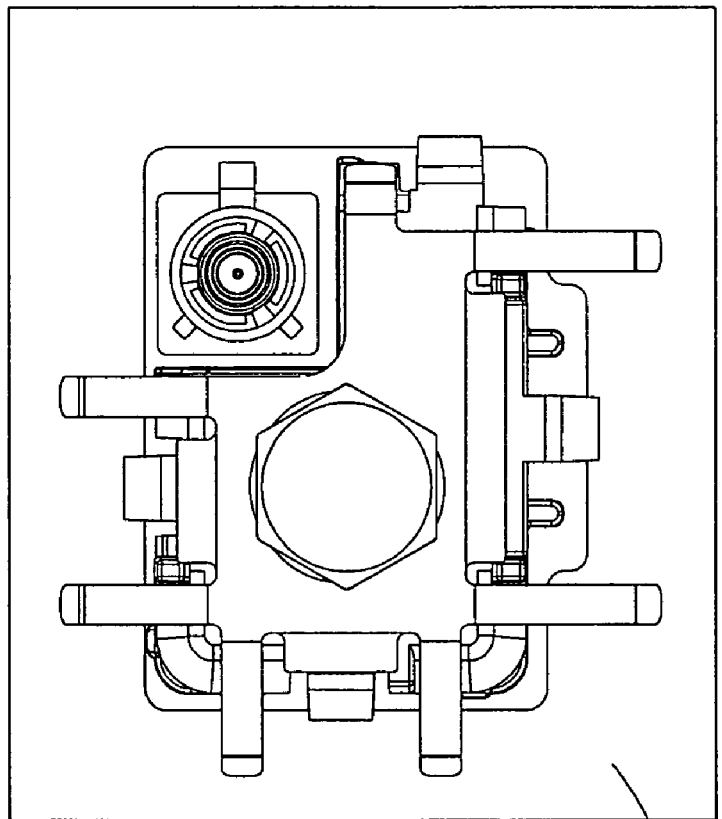
Figure 9:

FIG. 5 is a bottom view of the antenna assembly shown in FIG. 4 from inside the vehicle and illustrating the antenna assembly assembled to a vehicle roof through a cut out portion and temporarily held in place by virtue of the shoulder portions of the snap clip members being positioned on the interior compartment side of the vehicle roof while the antenna base is on the exterior side of the vehicle roof;

FIG. 6 is a side view of the antenna assembly shown in FIG. 5 and further illustrating the interaction of the snap clip members and the vehicle roof when the antenna assembly is assembled to the vehicle roof in the temporary or first installed position;

FIG. 7 is a perspective view of the antenna assembly shown in FIGS. 5 and 6;

FIGS. 8A through 8D are side views of the antenna assembly shown in FIG. 7 for various stages of the fastening mechanism deployment during installation of the antenna assembly to a vehicle roof; and FIG. 9 is a bottom view of the antenna assembly shown in FIGS. 8A-8D from inside the vehicle and illustrating the antenna assembly securely mounted to a vehicle roof with the retaining component's legs deformed and fully deployed against the interior compartments side of the vehicle roof.

DETAILED DESCRIPTION

The following description is merely exemplary in nature and is in no way intended to limit the present disclosure, application, or uses. It should be understood that throughout the drawings, corresponding reference numerals indicate like or corresponding parts and features.

According to various aspects, exemplary embodiments are provided of antenna assemblies, mounting methods, and mounting devices. In various exemplary embodiments, an antenna assembly is configured for installation to a vehicle body wall having a mounting hole. The antenna assembly generally includes an antenna base configured to be disposed along an external side of the vehicle with respect to the vehicle body wall. An electrical connector is coupled to the antenna base such that, when the antenna base is disposed along the external side of the vehicle, the electrical connector is accessible from inside the vehicle for a pluggable electrical connection to at least one communication link. That communication link may then be used for communicating signals received by the antenna assembly to another device. The antenna assembly may also include a fastener member and first and second retaining components. The first retaining component may have one or more tapered faces and one or more shoulder portions. The first retaining component may be inserted through the mounting hole such that the shoulder portions are disposed on the interior compartment side, while the antenna base is disposed on the external side of the vehicle body wall. In this stage of the installation process, the antenna assembly may thus be held in place relative to the vehicle body wall in a first installed position. The second retaining component may have one or more legs and an opening through which the fastener member passes. The one or more legs may be configured to make contact with corresponding tapered faces of the first retaining component. When the second retaining component is moved generally towards the mounting hole by driving the fastener member in a direction generally towards the antenna base, the one or more legs may deform and expand generally outwardly relative to the mounting hole against the interior compartment side of the vehicle body wall, thereby securing the antenna assembly to the vehicle body wall in a second, operational installed position.

In another exemplary embodiment, an antenna assembly is configured to be installed and fixedly mounted to a vehicle body wall after being inserted into a mounting hole in the vehicle body wall from an external side of the vehicle and nipped from the interior compartment side. The antenna assembly generally includes an antenna base configured to be disposed along an external side of the vehicle body wall. An electrical connector is coupled to the antenna base such that, when the antenna base is disposed along the external side of the vehicle body wall, the electrical connector is accessible from inside the vehicle for a pluggable electrical connection to at least one communication link. The communication link may be used for communicating signals received by the antenna assembly to another device.

Other aspects relate to methods of installing antenna assemblies to supporting structures, such as vehicle body walls having external and internal sides with a mounting hole therebetween. In some exemplary embodiments, a method generally includes inserting the antenna assembly into a mounting hole from an external side of the vehicle body wall, such that the antenna base is disposed along the external side of the vehicle body wall and such that an electrical connector coupled to the antenna base is accessible from the internal side of the vehicle body wall. In this stage of the installation process, the antenna assembly may be held in place relative to the vehicle body wall in a first installed position by shoulder portions of a first retaining component of the antenna assembly being disposed along the internal side of the vehicle body wall. Then, from the internal side of the vehicle body wall, a fastener member may be driven to compressively move a second retaining component such that one or more legs of the second retaining component deform and expand generally outwardly relative to the mounting hole against the second side of the supporting structure, thereby securing the antenna assembly to the supporting structure in a second, operational installed position. Also from the internal side of the vehicle body wall, at least one communication link may be plugged into the electrical connector of the antenna assembly to thereby allow the communication link to communicate signals received by the antenna assembly to another device.

In some preferred embodiments, the electrical connector includes an ISO (International Standards Organization) standard electrical connector or a Fakra connector. In these embodiments, a coaxial cable (or other suitable communication link) may be electrically connected to the ISO connector or Fakra connector. The coaxial cable may be used for communicating signals received by the antenna assembly to another device, such as a radio receiver, display screen, and/or other suitable device. In such embodiments, the use of a standard type electrical connector (e.g., ISO connector, Fakra connector, etc.) may allow for reduced costs as compared to those antenna installations that require a customized design and tooling for the electrical connection between the antenna assembly and electrical wiring.

In addition, various embodiments allow for pluggable electrical connections between a communication link and the antenna assembly's electrical connector without requiring the installer to route wiring or cabling through the mounting hole. This pluggable electrical connection may be easily accomplished without requiring any particular technical and/or skilled operations on the part of the installer.

The fastener or driving member may comprise a wide range of suitable devices. By way of example, the fastener member may comprise a threaded bolt with a hexagonal head. The threaded bolt may be threadedly engagable to a threaded portion (e.g., threaded insert, etc.) associated with the antenna base. For example, the threaded portion may comprise a threaded insert or threaded member that is attached to the antenna base. Or, for example, the threaded portion may be integrally defined or formed by the antenna base. Once the fastener member is threaded into the threaded portion associated with the antenna base, the fastener member captures the second retaining component against the other components associated with the antenna base. This facilitates antenna installation since the retaining components and fastener member will not fall or drop out as the antenna assembly is being installed.

As mentioned above for the electrical connector, the fastener member is also accessible from inside the vehicle after the antenna assembly has been positioned onto the vehicle roof from outside the vehicle. This, in turn, allows an installer to drive the fastener member for moving the second retaining component in the direction generally towards the mounting hole of the vehicle roof (or other suitable mounting location). In yet other embodiments, the fastener member may not include threads, but may instead be provided with other suitable means for engaging the antenna base.

Additional embodiments include the legs of the second retaining component having cam surfaces or portions. These cam surfaces are configured to contact corresponding tapered surfaces of the first retaining component. Accordingly, when the second retaining component is compressively moved towards the first retaining component, this contact between the cam surfaces and the tapered surfaces may facilitate and/or cause generally outward flexing or movement of the retaining legs.

The legs may also include end portions configured to contact the interior compartment side of the vehicle roof, for example. This contact may also facilitate and/or cause generally outward flexing or movement of the retaining legs when the second retaining component is compressively moved towards the interior compartment side of the vehicle roof. By way of example, the legs may include outwardly bent end portions. As other examples, the legs may have end portions with L-shaped profiles, U-shaped profiles, other configurations, combinations thereof, etc.

In some embodiments, the antenna assembly may include a patch antenna for receiving radio signals. The antenna assembly may also include a passive directional element for increasing patch antenna gain in a particular direction.

In various embodiments, an antenna assembly may be mounted to a roof of a vehicle, although this is not required for all embodiments. By way of example, an antenna assembly may be installed to a vehicle as follows. First, a bolt (or other suitable fastener member) is threaded into the antenna base through a hole in the second retaining component, thereby capturing the second retaining component against the other components associated with the antenna base. From outside the vehicle, the installer then downwardly positions the antenna assembly (and components thereof) relative to a cutout portion or opening through the vehicle roof such that the bolt's head and the electrical connector are both accessible from inside the vehicle. In some embodiments, the legs of the second retaining component and the ramp surfaces of the first retaining component are configured (e.g., dimensionally sized, shaped, etc.) such that the legs (when initially sitting on the ramped surfaces) will not catch the inside of the roof cutout portion as they are inserted through the mounting hole.

In this first installed position, the antenna assembly is temporarily retained within the cutout portion by virtue of the shoulder portions of the snap clip members being snapped or disposed under the interior compartment side of the vehicle roof, while the antenna base is on the external side of the vehicle roof. The installer may then enter the vehicle to access the bolt head and plug a communication link (e.g., coaxial cable, etc.) into the electrical connector. The installer may rotate the bolt to threadedly insert the bolt into a corresponding threaded portion associated with (e.g., attached to, integral with, etc.) the antenna base. With this rotation of the bolt, the bolt's head abuts against and compressively moves the second retaining component towards the mounting hole and antenna base. With this relative movement of the second retaining component towards the vehicle roof, the retaining legs slidingly move against the corresponding tapered or ramped surfaces of the first retaining component. This, in turn, may facilitate or cause at least portions of the retaining legs to deform and expand generally outwardly to engage the vehicle roof. In addition, the end portions of the retaining legs will also contact the interior compartment side of the vehicle roof. This contact may also facilitate or cause the retaining legs to deform and expand generally outwardly and engage the vehicle roof. Accordingly, the antenna assembly is thus secured to the vehicle roof in a final installed position. The retaining legs may be configured (e.g., shaped, sized, formed of materials, etc.) so that the material(s) (e.g., stainless steel, etc.) from which the retaining legs are formed does not fail during the deformation with a safety margin.

FIGS. 1 through 9 illustrate an exemplary antenna assembly 100 embodying one or more aspects of the present disclosure. As shown, the antenna assembly 100 includes an antenna base 104, an electrical connector 108, and first and second retaining components or members 110 and 112. As shown, the second retaining component 112 is being used to mount the antenna assembly 100 to a vehicle roof R.

Figure 1:
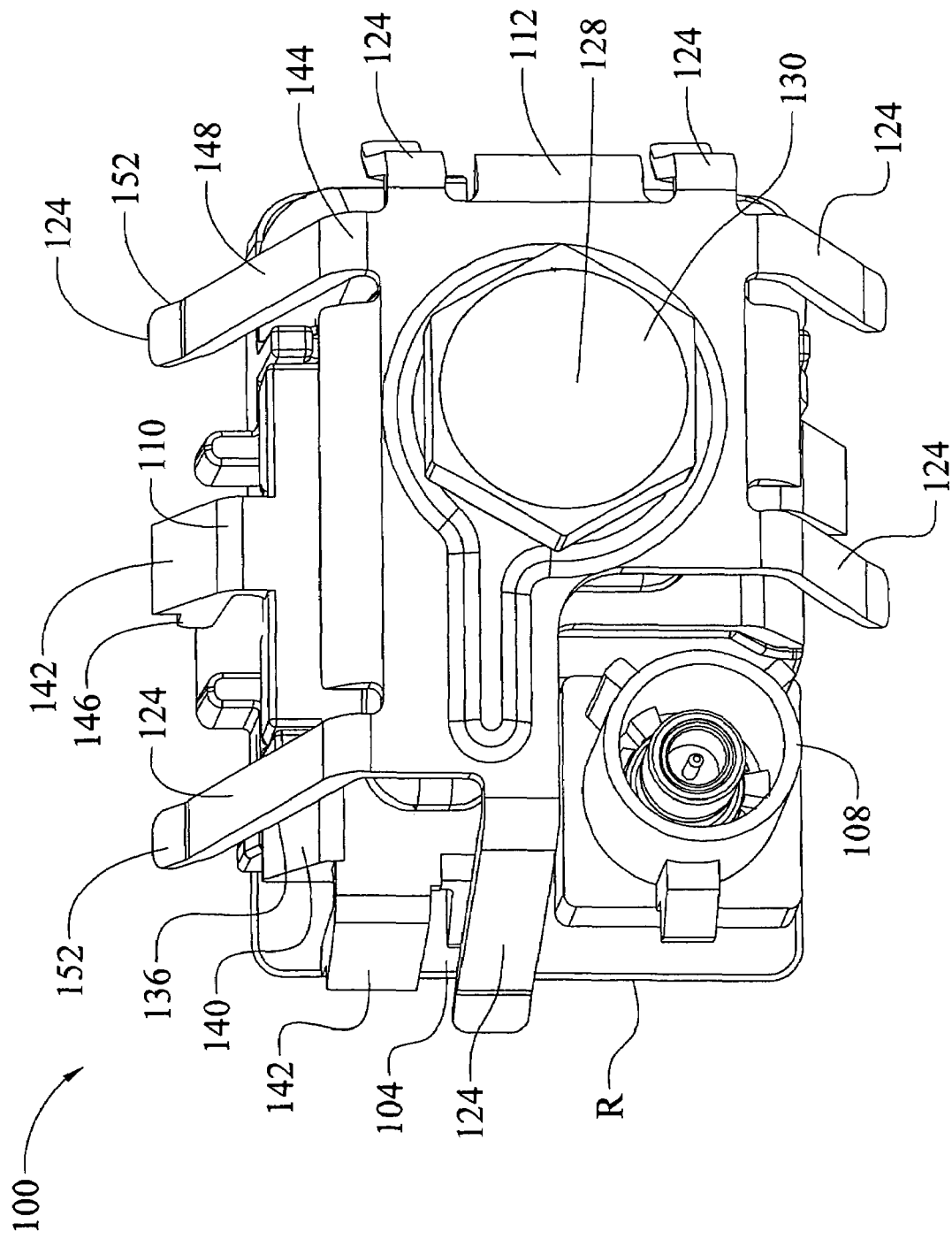
FIG. 1 is a perspective view of an antenna assembly shown from inside a vehicle and illustrating the antenna assembly fixedly mounted to a vehicle roof according to exemplary embodiments.

With continued reference to FIG. 1, the second retaining component 112 includes an opening 120 and legs 124. The opening 120 is sized to allow the threaded portion 126 of a fastener member 128 to pass therethrough.

In the particular illustrated embodiment of FIG. 1, the fastener member 128 comprises a threaded bolt having a hexagonal head 130. The threaded bolt is threadingly engaged to a correspondingly threaded portion 134 associated with the antenna base 104. By way of example, the threaded portion 134 may comprise a threaded insert or threaded member that is separately attached or coupled to the antenna base 104. Or, for example, the threaded portion 134 may be integrally defined or formed by the antenna base 104.

When the fastener member 128 is threaded into the threaded portion 134 associated with the antenna base 104 (as shown in FIG. 4), the fastener member 128 captures the second retaining component 112 against the other components associated with the antenna base 104. This facilitates antenna installation since the first and second retaining components 110, 112 and fastener member 128 will not fall or drop out as the antenna assembly 100 is being installed. Capturing the components in this exemplary manner also allows the installer (from outside the vehicle) to position the antenna assembly 100 (and components 104, 108, 110, 112, 124, 128 thereof as a single unit into an opening or mounting hole of a vehicle roof. Advantageously, this allows for a reduction in the number of operations or steps needed for antenna installation as compared to those installation methods in which there is no such capturing of the fastener and retaining components.

This illustrated embodiment allows an installer to use a socket wrench or other suitable tool to grip the hexagonal head 130 and rotate the threaded bolt. As the threaded bolt is rotated, the threaded bolt is threaded into the corresponding threaded portion 134 associated with the antenna base 104. Alternative embodiments may include other suitable driving elements, fasteners, bolts having differently-shaped or non-hexagonal heads, etc.

Also shown in the figures, the second retaining component 112 includes seven retaining legs 124 having cam surfaces 136. The cam surfaces 136 are configured to contact corresponding tapered or ramped surfaces 140 of the first retaining component 110. With the relative movement of the second retaining component 112 towards the antenna base 104 upon rotation of the fastener member 128, the contact between the retaining leg's cam surfaces 136 and the corresponding tapered surfaces 140 can facilitate or cause the retaining legs 124 (or at least the outwardly bent feet or end portions 152 thereof) to deform and expand generally outward. The contact between the end portions 152 of the legs 124 and the interior side of the vehicle roof R may also help facilitate or cause the legs 124 (or at least the outwardly bent feet or end portions 152 thereof to deform and expand generally outward. This outward deformation and flexing of the retaining legs 124 provides a relatively secure engagement with the vehicle roof R.

With continued reference to FIG. 1, each retaining leg 124 has a first generally flat portion 144, a second slanted portion 148, and a third slanted end portion 152. The first portion 144 is connected to the portion of the second retaining member 112 that defines the opening 120 such that a first angle is defined therebetween. The second portion 148 extends from the first portion 144 such that a second angle is defined therebetween. Each retaining leg 124 terminates at the third slanted end portion 152. The third slanted end portion 152 extends from the second slanted portion 148 such that a third angle is defined therebetween. The first, second, and/or third angles may change as the antenna assembly 100 is being installed due to the outward flexing of the retaining legs 124. For example, the second angle defined between the first and second leg portions 144 and 148 may increase as the retaining legs 124 flex generally outwardly during the installation process. In preferred embodiments, the legs 124 and the ramp surfaces 140 are configured (e.g., dimensionally sized, shaped, etc.) such that the legs 124 (when initially sitting on the ramped surfaces 140) will not catch the inside of the roof cutout portion as they are inserted through the mounting hole in the vehicle roof. The particular configurations for the retaining legs and ramp surfaces may depend, for example, on the particular location at which the antenna assembly is to be used, space considerations, etc. In addition, each retaining leg does not necessarily have the same configuration (e.g., size, shape, etc.) in other embodiments. Alternative embodiment may include more or less than seven retaining legs, and/or retaining legs having different configurations (e.g., shapes, dimensions, etc.) than what is show in the figures. For example, other embodiments include retaining legs with L-shaped or U-shaped feet or end portions.

The antenna assembly 100 also includes the electrical connector 108. In some preferred embodiments, the electrical connector 108 is a standard ISO electrical connector or a Fakra connector attached to the antenna base 104. Accordingly, a coaxial cable may be relatively easily connected to the antenna assembly 100. The coaxial cable may be used for communicating signals received by the antenna assembly 100 to another device electrically connected to the other end of the coaxial cable, such as a radio receiver or other suitable device. In such embodiments, the use of standard ISO electrical connectors or Fakra connectors may allow for reduced costs as compared to those antenna installations that require a customized design and tooling for the electrical connection between the antenna assembly and cable. In addition, the pluggable electrical connections between the communication link and the antenna assembly's electrical connector may be accomplished by the installer without the installer having to route wiring or cabling through the mounting hole. Accordingly, the pluggable electrical connection may be easily accomplished without requiring any particular technical and/or skilled operations on the part of the installer. Alternative embodiments, however, may include using other types of electrical connectors and communication links, besides standard ISO electrical connectors, Fakra connectors, and coaxial cables.

Figure 2:
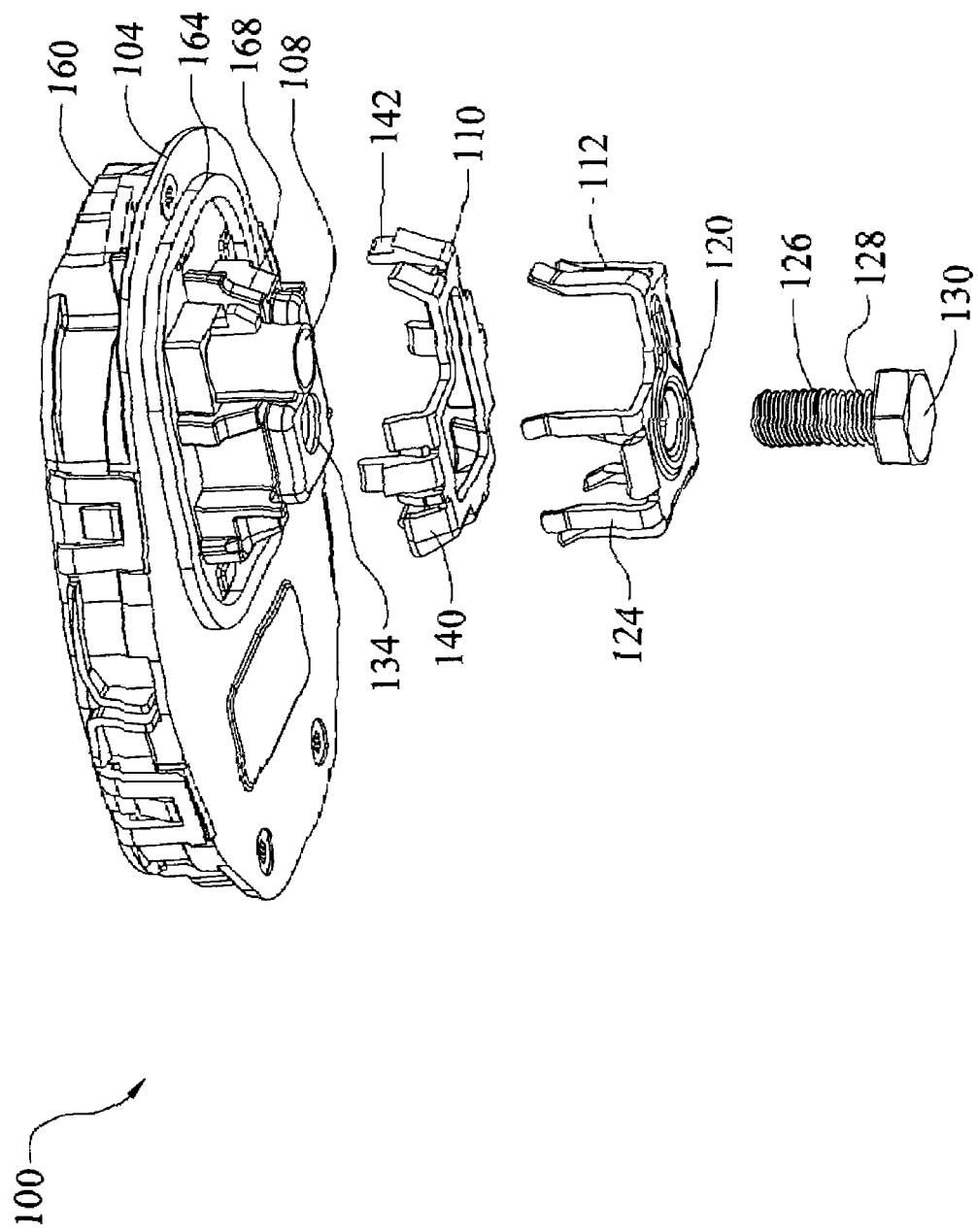
FIG. 2 is an exploded perspective view of the antenna assembly shown in FIG. 1.
Figure 3:
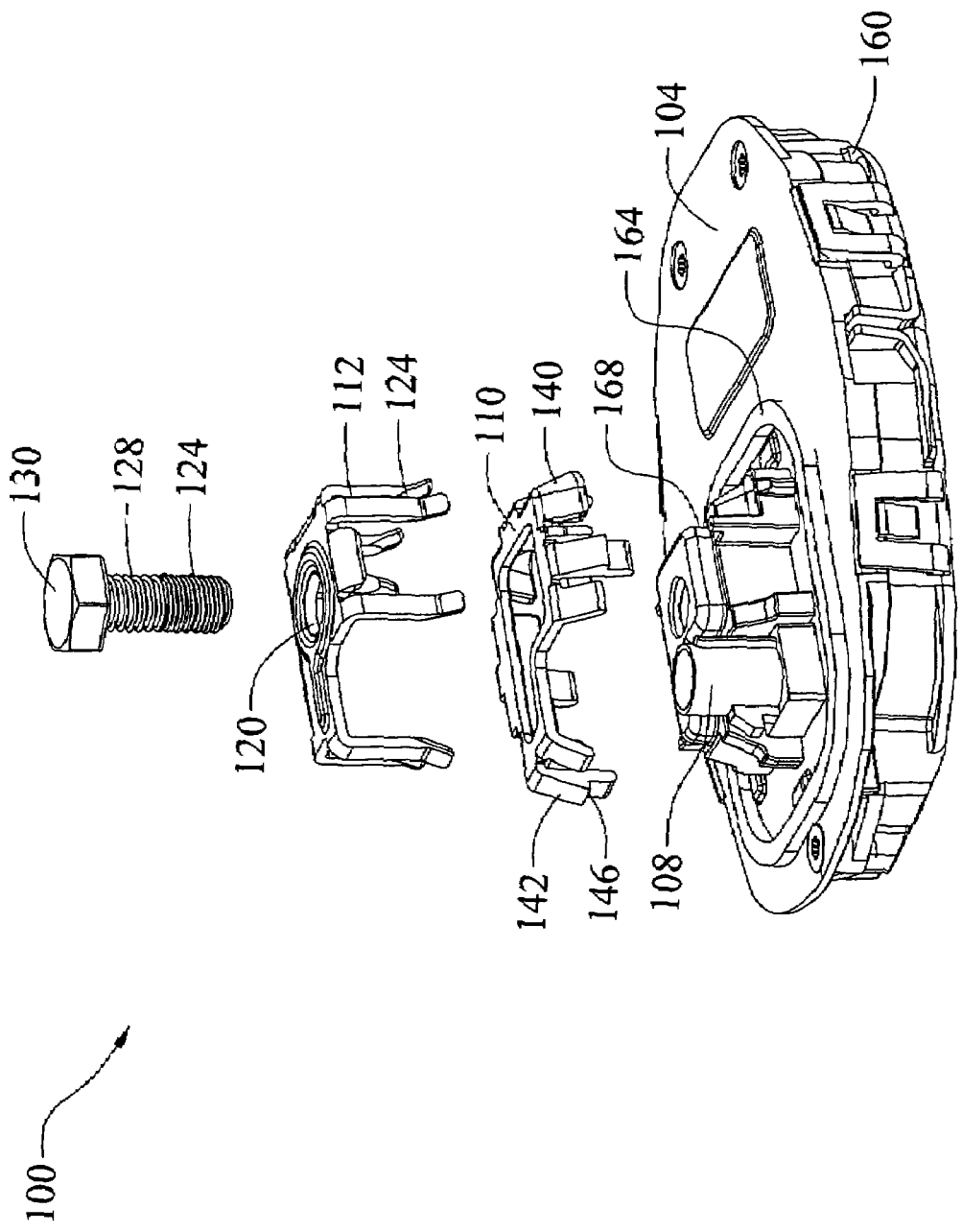
FIG. 3 is another exploded perspective view of the antenna assembly shown in FIG. 2.

By way of example only, some embodiments of the antenna assembly 100 include a patch antenna positioned on a circuit board. The circuit board may be secured to a chassis, such as a chassis die cast from zinc. An external housing or radome may be provided for enclosing the aforementioned items. As shown in FIGS. 2 and 3, a protective cover or housing 160 is attached (e.g., latched, snap-clipped, etc.) to the antenna base 104. In addition, a sealing member 164 (e.g., O-ring, foam gasket, etc.) is also provided for substantially sealing the underside of the antenna base 104 and the external side of the vehicle roof R. As shown, the seal 164 is generally annular and is seated within a groove generally surrounding the protruding portion 168. Preferably, the seal 164 prevents (or at least inhibits) the ingress or penetration of water, moisture, dust, or other contaminants through the mounting hole into the interior of the vehicle.

The antenna assembly 100 may also include a directional element that is positioned on an external surface of the housing. In some embodiments, a protective layer or shield may protect the directional element from weather and the elements.

Referring now to FIGS. 2 through 9, an exemplary installation process will now be described for antenna assembly 100. First, the bolt 128 is inserted into the opening 120 of the second retaining component 112 (FIGS. 2 and 3). The bolt 128 is partially threaded into the threaded portion 134 associated with the antenna base 104. As shown in FIG. 5, the fastener member 128 accordingly captures the second retaining component 112 against the other components associated the antenna base 104.

With reference to FIGS. 5 through 8A, the antenna assembly 100 may then be positioned (from outside the vehicle) as a single unit into an opening or cutout portion of the vehicle roof R. As the antenna assembly 100 is moved downwardly relative to the roof cutout portion, the snap clip members 142 will be deformed or distorted inward temporarily, but they will expand outwardly upon passing through the mounting hole completely due to their resiliency or elasticity. In this stage of the assembly process, the antenna assembly 100 is temporarily held in place by virtue of the interaction of the shoulder portions 146 of snap clip members 142, vehicle roof R, and antenna base 104. As shown in FIGS. 5 through 8A, the ledge or shoulder portions 146 of the snap clip members 142 are disposed under the interior compartment side of the vehicle roof R, while the antenna base 104 is disposed on the exterior side of the vehicle roof R.

The installer may then enter the vehicle to access the head 130 of the fastener member 128 and the electrical connector

108. The installer may then use a socket wrench or other suitable tool to grip the hexagonal head 130 and rotate the fastener member 128. FIGS. 8A through 8D shows various stages of the fastening mechanism deployment as the fastener member 128 is driven to move the second retaining component 112 and cause the legs 124 to deform and expand generally outwardly relative to the roof cutout portion. FIG. 9 illustrates the antenna assembly 100 securely mounted to the vehicle roof R with the retaining legs 124 deformed and fully deployed against the interior compartments side of the vehicle roof R.

Also from inside the vehicle, the installer may then plug an electrical connector at an end of a communication link (e.g., coaxial cable) into the antenna assembly's electrical connector 108. The other end of the communication link may be electrically connected to another device, such as a radio receiver, display screen, or other suitable device. Accordingly, the communication link may be used for communicating signals from the antenna assembly 100 to that other device.

Embodiments and aspects of the present disclosure may be used in a wide range of antenna applications, such as patch antennas, telematics antennas, antennas configured for receiving satellite signals (e.g., Satellite Digital Audio Radio Services (SDARS), Global Positioning System (GPS), cellular signals, etc.), antennas configured for receiving RF energy or radio transmissions (e.g., AM/FM radio signals, etc.), combinations thereof, among other signals communicated between antennas. Accordingly, the specific references to patch antennas herein should not be construed as limiting the scope of the present disclosure to only one specific form/type of antenna assembly.

In addition, the various antenna assemblies and components disclosed herein may be mounted to a wide range of supporting structures, including stationary platforms and mobile platforms. For example, an antenna assembly disclosed herein could be mounted to supporting structure of a bus, train, aircraft, among other mobile platforms, as well as to stationary platforms. Accordingly, the specific references to vehicle herein should not be construed as limiting the scope of the present disclosure to any specific type of supporting structure or environment.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An antenna assembly configured to be installed and fixedly mounted to a vehicle body wall after being inserted into a mounting hole in the vehicle body wall from an external side of the vehicle and nipped from the interior compartment side, the antenna assembly comprising:
    an antenna base configured to be disposed along an external side of the vehicle body wall;
    an electrical connector coupled to the antenna base such that, when the antenna base is disposed along the external side of the vehicle body wall, the electrical connector is accessible from inside the vehicle for a pluggable electrical connection to at least one communication link for communicating signals received by the antenna assembly to another device;
    a first retaining member having tapered faces and shoulder portions configured to be inserted through the mounting hole such that the shoulder portions are snapped under the interior compartment side while the antenna base is disposed on the external side of the vehicle body wall, to thereby help hold the antenna assembly in place relative to the vehicle body wall in a first installed position;
    a second retaining member having two or more legs, the two or more legs configured to be inserted through the mounting hole without catching the inside of the mounting hole, the two or more legs defining a spaced distance therebetween less than a width of the mounting hole in the first installed position, the two or more legs configured for making contact with the corresponding tapered faces of the first retaining member as the second retaining member moves generally towards the mounting hole, whereby the two or more legs achieve a second installed position in which the spaced distance defined by the two or more legs is greater than the width of the mounting hole;
    a fastener member that captures the first and second retaining components to the antenna base, thereby allowing the antenna base and the first and second retaining components to be positioned collectively as a single unit relative to the mounting hole.

2. The antenna assembly of claim 1, wherein the electrical connector comprises a coaxial cable connector configured to allow a corresponding coaxial cable connector to be plugged therein from inside the vehicle.

3. The antenna assembly of claim 1, wherein the electrical connector comprises at least one ISO standard electrical connector for electrical connection to at least one coaxial cable.

4. The antenna assembly of claim 3, further comprising a coaxial cable electrically connected to the at least one ISO standard electrical connector for communicating signals received by the antenna assembly to another device.

5. The antenna assembly of claim 1, wherein the electrical connector comprises a coaxial cable connector.

6. The antenna assembly of claim 1, wherein the electrical connector comprises a Fakra connector.

7. The antenna assembly of claim 1, wherein the electrical connector comprises a male or female connector portion configured for making a pluggable electrical connection with a corresponding male or female connector portion disposed at an end of the at least one communication link.

8. An antenna assembly for installation to a vehicle body wall having a mounting hole, the antenna assembly comprising:
- an antenna base configured to be disposed along an external side of the vehicle body wall;
- an electrical connector coupled to the antenna base such that, when the antenna base is disposed along the external side of the vehicle body wall, the electrical connector is accessible from inside the vehicle for a pluggable electrical connection to at least one communication link for communicating signals received by the antenna assembly to another device;
- a first threaded portion;
- a snap clip component having one or more tapered faces and one or more snap clip members with shoulder portions and configured to be inserted through the mounting hole with the shoulder portions thereof disposed on the interior compartment side while the antenna base is disposed on the external side of the vehicle body wall, to thereby help hold the antenna assembly in place relative to the vehicle body wall in a first installed position;
- a fastener member having a second threaded portion threadedly engagable to the first threaded portion;
- a retaining clip member having an opening through which the fastener member passes for capturing the retaining clip member and the snap clip component to the antenna base, and one or more legs extending in a direction generally away from the opening towards the mounting hole, the one or more legs configured for making contact with the corresponding tapered faces of the snap clip component as the retaining clip member is moved generally towards the mounting hole when the fastener member is threadedly engaged to the first threaded portion;
- whereby threadedly engaging the fastener member to the first threaded portion compressively moves the retaining clip member in the direction generally towards the mounting hole such that the one or more legs deform and expand generally outwardly relative to the mounting hole against the interior compartment side of the vehicle body wall, thereby securing the antenna assembly to the vehicle body wall in a second, operational installed position.

9. The antenna assembly of claim 8, further comprising a patch antenna electrically connected to the electrical connector.

10. The antenna assembly of claim 8, wherein the fastener member captures the retaining clip member and the snap clip component to the antenna base, thereby allowing the antenna base, retaining clip member, and snap clip component to be positioned collectively as a single unit relative to the mounting hole.

11. The antenna assembly of claim 8, wherein the retaining clip member includes two or more legs configured to be freely inserted through the mounting hole without requiring inward movement thereof and without catching the inside of the mounting hole.

12. The antenna assembly of claim 8, wherein the retaining clip member includes two or more legs that define a first spaced distance therebetween less than a width of the mounting hole in the first installed position, the two or more legs being moved outwardly so as to define a second spaced distance therebetween greater than the width of the mounting hole in the second, operational installed position.

13. An antenna assembly for installation to a vehicle body wall having a mounting hole, the antenna assembly comprising:
- an antenna base configured to be disposed along an external side of the vehicle with respect to the vehicle body wall;
- an electrical connector coupled to the antenna base such that, when the antenna base is disposed along the external side of the vehicle, the electrical connector is accessible from inside the vehicle for a pluggable electrical connection to at least one communication link for communicating signals received by the antenna assembly to another device;
- a first retaining component having tapered faces and shoulder portions configured to be inserted through the mounting hole with the shoulder portions disposed on the interior compartment side while the antenna base is disposed on the external side of the vehicle body wall, to thereby help hold the antenna assembly in place relative to the vehicle body wall in a first installed position;
- a fastener member;
- a second retaining component having an opening through which the fastener member passes for capturing the first and second retaining components to the antenna base, and one or more legs extending in a direction generally away from the opening towards the mounting hole, the one or more legs configured for making contact with the corresponding tapered faces of the first retaining component as the second retaining component moves generally towards the mounting hole;
- whereby driving the fastener member in a direction generally towards the antenna base compressively moves the second retaining component in the direction generally towards the mounting hole such that the one or more legs deform and expand generally outwardly relative to the mounting hole against the interior compartment side of the vehicle body wall, thereby securing the antenna assembly to the vehicle body wall in a second, operational installed position.

14. The antenna assembly of claim 13, wherein the electrical connector comprises a coaxial cable connector configured to allow a corresponding coaxial cable connector to be plugged therein from inside the vehicle.

15. The antenna assembly of claim 13, wherein the electrical connector comprises at least one ISO standard electrical connector for electrical connection to at least one coaxial cable.

16. The antenna assembly of claim 15, further comprising a coaxial cable electrically connected to the at least one ISO standard electrical connector for communicating signals received by the antenna assembly to another device.

17. The antenna assembly of claim 13, wherein the electrical connector comprises a coaxial cable connector.

18. The antenna assembly of claim 13, wherein the electrical connector comprises a Fakra connector.

19. The antenna assembly of claim 13, wherein the electrical connector comprises a male or female connector portion configured for making a pluggable electrical connection with a corresponding male or female connector portion disposed at an end of the at least one communication link.

20. The antenna assembly of claim 13, wherein the fastener member comprises a threaded bolt having a head accessible to an installer from inside the vehicle when the antenna assembly is being retained to the vehicle body wall in the first installed position by the first retaining component, whereupon driving the threaded bolt causes the threaded bolt's head to abut against and move the second retaining component in the direction generally towards the mounting hole.

21. The antenna assembly of claim 13, wherein the one or more legs of the second retaining component include inner cam surface portions configured to contact the corresponding tapered faces of the first retaining component, the contact causing the one or more legs to deform and move generally outward relative to the mounting hole against the interior compartment side of the vehicle body wall.

22. The antenna assembly of claim 13, wherein the one or more legs of the second retaining component include outwardly bent end portions for engaging the interior compartment side of the vehicle body wall.

23. The antenna assembly of claim 13, wherein the one or more legs of the second retaining component include a first generally flat portion adjacent the opening, and defining a first angle therewith, a second slanted portion extending from the first generally flat portion and defining a second angle therewith, and a third slanted end portion extending from the second slanted portion and defining a third angle therewith, the third slanted end portion configured for engaging the interior compartment side of the vehicle body wall.

24. The antenna assembly of claim 13, further comprising a patch antenna electrically connected to the electrical connector.

25. The antenna assembly of claim 13, wherein the fastener member captures the first and second retaining components to the antenna base, thereby allowing the antenna base and the first and second retaining components to be positioned collectively as a single unit relative to the mounting hole.

26. The antenna assembly of claim 13, wherein the second retaining component includes two or more legs configured to be freely inserted through the mounting hole without requiring inward movement thereof and without catching the inside of the mounting hole.

27. The antenna assembly of claim 13, wherein the second retaining component includes two or more legs that define a first spaced distance therebetween less than a width of the mounting hole in the first installed position, the two or more legs being moved outwardly so as to define a second spaced distance therebetween greater than the width of the mounting hole in the second, operational installed position.

28. A method of installing an antenna assembly to a vehicle body wall having external and internal sides with a mounting hole therebetween, the method comprising:
from an external side of the vehicle body wall, inserting the antenna assembly into the mounting hole such that an antenna base of the antenna assembly is disposed along the external side of the vehicle body wall and such that an electrical connector coupled to the antenna base is accessible from the internal side of the vehicle body wall, whereby the antenna assembly is held in place relative to the vehicle body wall in a first installed position by shoulder portions of a first retaining component of the antenna assembly being disposed along the internal side of the vehicle body wall;
from the internal side of the vehicle body wall, driving a fastener member to compressively move a second retaining component of the antenna assembly that is captured along with the first retaining component to the base by the fastener member, such that one or more legs of the second retaining component deform and expand generally outwardly relative to the mounting hole against the internal side of the vehicle body wall, thereby securing the antenna assembly to the supporting structure in a second, operational installed position; and
from the internal side of the vehicle body wall, plugging at least one communication link into an electrical connector coupled to the antenna base to thereby allow the communication link to communicate signals received by the antenna assembly to another device.

29. The method of claim 28, wherein the electrical connector enables an installer to electrically connect the antenna assembly to at least one communication link without having to route electrical wiring through the mounting hole.

30. The method of claim 28, wherein plugging at least one communication link includes plugging a coaxial cable into the electrical connector.

31. The method of claim 30, wherein the electrical connector comprises an ISO standard electrical connector or a Fakra electrical connector.

32. The method of claim 28, wherein the first and second retaining components are captured to the base by the fastener member before the antenna assembly is inserted into the mounting hole such that inserting the antenna assembly into the mounting hole comprises positioning the antenna base and the first and second retaining components collectively as a single unit relative to the mounting hole.

33. The method of claim 28, wherein the second retaining component includes two or more legs configured to be freely inserted through the mounting hole without requiring inward movement thereof and without catching the inside of the mounting hole, such that inserting the antenna assembly into the mounting hole comprises inserting the two or more legs of the second retaining component through the mounting hole without any inward movement of the two or more legs.

34. The method of claim 28, wherein:
the second retaining component includes two or more legs that define a first spaced distance therebetween less than a width of the mounting hole in the first installed position;
driving the fastener member to compressively move the second retaining component includes deforming and expand the two or more legs generally outwardly relative to the mounting hole against the internal side of the vehicle body wall such that the two or more legs define a second spaced distance therebetween greater than the width of the mounting hole in the second, operational installed position.

* * * * *